(12) United States Patent
Tanaka (10) Patent No.: US 7,959,706 B2
(45) Date of Patent: Jun. 14, 2011

(54) MANUFACTURING METHOD OF A SINTERED POWDER MOLDED BODY

(75) Inventor: Shigeo Tanaka, Osaka (JP)

(73) Assignee: Taisei Kogyo, Ltd., Neyagawa-shi (JP)

( * ) Notice: Subject to any disclaimer, the term of this patent is extended or adjusted under 35 U.S.C. 154(b) by 0 days.

(21) Appl. No.: 12/648,632

(22) Filed: Dec. 29, 2009

(65) Prior Publication Data

US 2010/0119767 A1 May 13, 2010

Related U.S. Application Data (60) Division of application No. 10/978,577, filed on Nov. 2, 2004, now Pat. No. 7,662,338, which is a continuation of application No. PCT/JP03/04323, filed on Apr. 3, 2003.

(51) Int. Cl.
*C22C 29/00* (2006.01)
*B32B 3/06* (2006.01)

(52) U.S. Cl. ............ 75/230; 75/228; 428/101; 428/457; 428/469; 428/539.5; 428/688; 419/8; 419/36; 419/37; 419/38

(58) Field of Classification Search .................... 419/36; 75/230; 428/457, 469, 539.5, 688
See application file for complete search history.

(56) References Cited

U.S. PATENT DOCUMENTS 5,482,671 A    1/1996   Weber

FOREIGN PATENT DOCUMENTS

| JP | 4-070313 A | 3/1992 |
| JP | 4-329802 A | 11/1992 |
| JP | 5-320706 A | 12/1993 |
| JP | 7-41802 A | 2/1995 |
| JP | 2003-183705 A | 7/2003 |

OTHER PUBLICATIONS

Merriam-Webster online dictionary, definition of "cover", http://www.merriam-webster.com/dictionary/cover, printed on Feb. 16, 2009.

*Primary Examiner* — Roy King
*Assistant Examiner* — Christopher Kessler
(74) *Attorney, Agent, or Firm* — Westerman, Hattori, Daniels & Adrian, LLP (57) ABSTRACT

A sintering compound containing a sinterable powder and a binder removable in a debinding step is injected into a metal mold set provided with a sintering compound injecting mold, in a sintering compound molding step (S104). An add-on forming compound which becomes removable or separable from the sintering compound injection molded body in the debinding step or the sintering step is injected into the metal mold set provided with an add-on mold in an add-on forming step (S102). The sintering compound injection molded body and the add-on are formed integrally with each other in the metal mold set. The integral formation of the add-on and the sintering compound injection molded body enables to prevent damage during release from the mold and make easy to handle the injection molded body.

3 Claims, 10 Drawing Sheets

MANUFACTURING METHOD OF A SINTERED POWDER MOLDED BODY

CROSS-REFERENCE TO RELATED APPLICATIONS

This is a divisional application of U.S. patent application Ser. No. 10/978,577, filed on Nov. 2, 2004, now U.S. Pat. No. 7,662,338, which is a continuation of International Application No. PCT/JP03/04323, filed on Apr. 3, 2003, the entire contents of which are incorporated herein by references.

TECHNICAL FIELD

The present invention relates to manufacturing methods and related techniques for sintered powder injection molded bodies. Specifically, the present invention relates to manufacturing methods and related techniques for sintered powder injection molded bodies made through a sintering compound molding step in which a sintering compound containing a binder and a sinterable powder is injected into a metal mold set.

BACKGROUND ART

Powder injection molding includes three steps: a sintering compound molding step in which power of a metal for example is mixed with other components such as a resin binder, under heat until the mix is fluid, and then the mix is injected to form a molded body; a debinding step in which the molded body is heated to remove the resin binder; and a sintering step in which the molded body is heated at a higher temperature until the powder is sintered. When the powder is provided by a metal, the method is commonly known as MIM (Metal Powder Injection Molding) method, and is widely used in manufacture of metal objects such as metal parts having complex geometries.

Powder injection molding uses essentially the same injection molders as used in plastic injection molding. However, since the feedstock contains a greater ratio of sintering powder than the resin binder, there is a problem that the intermediate, i.e. the body as injection molded, is lower in strength than typical resin products manufactured by injection molding. In particular, due to the debinding and sintering steps that must follow the step of injection molding, handling is often difficult between these steps. Typically, molded bodies of a complicated shape are often damaged while they are being moved for the next step.

In addition, due to the lower strength of the molded body, the body is often damaged when removed from the mold. This poses a special difficulty in the removal of a small body or a body which has a complicated shape.

In typical resin injection molding, small bodies are connected via a runner in a single mold, then formed in a single shot, and a resulted tree of the bodies are often handled as a single piece. However, this is very difficult in powder injection molding. Because of lower strength of the molded body, a plurality of bodies connected via a runner and molded in a single injection is very difficult to release from the mold. Therefore, producing a small body of a complicated shape by means of powder injection molding greatly decreases production efficiency.

In recent years, there have been attempts to employ LIGA (Lithographie Galvanoformung Abformung) processes in the production of metal mold sets for resin injection molding, as part of various efforts to build so called micro machines. However, for the reasons described above, it has been very difficult to make micro machines from powder injection molded bodies containing a metal or a ceramic.

DISCLOSURE OF THE INVENTION

The present invention can solve the problems of handling the powder injection molded body, and make possible to remove the body easily from the mold even if the body has a complicated shape. Further, when a plurality of products are formed simultaneously, it is possible to handle a tree of bodies as a single piece like a tree of resin bodies.

The first aspect of the present application is a manufacturing method of a sintered powder injection molded body, including: a sintering compound molding step of injecting a sintering compound containing a binder and a sinterable powder, into a metal mold set provided with a sintering compound injecting mold; a debinding step of removing the binder from sintering compound injection molded bodies obtained from the sintering compound molding step; and a sintering step of making sintered bodies by sintering the debound sintering compound injection molded bodies. The method further includes an add-on forming step of forming an add-on to be integral with the sintering compound injection molded body by injecting into the metal mold set provided with an add-on mold an add-on forming compound which becomes removable or separable from the sintering compound injection molded body in the debinding step or the sintering step.

The manufacturing method of a sintered powder molded body according to the present invention includes a plurality of molding steps in which at least two kinds of feedstock are injected into the metal mold set. An injection molder to be used with the present invention should be able to inject at least two kinds of feedstock into a set of metal mold continuously or intermittently. Alternatively, a plurality of injection molding steps may be performed with a plurality of injection molding machines, with the metal mold set being moved from one of the machines after another. Further, the present invention may be applied to a hot injection molding process using a thermoplastic resin binder, or to a cold injection molding process using an aqueous resin binder.

Further, the sintering compound injection molded body may be formed through a plurality of injection molding steps, and likewise, the add-on may also be formed by a plurality of the steps. In these cases, the sintering compound injection molded body or the add-on may be formed of the same feedstock, or each may be formed of plural kinds of feedstock. When manufacture calls for the plural injection molding steps, the metal mold set is made to successively provide the plural injection molding spaces.

The add-on may be formed for a variety of purposes. For example, the add-on may be formed in order to protect the sintering compound injection molded body when the molded body is removed from the mold. Portions which are difficult to demold or which have complicated shapes may be formed as covered by the add-on, which makes possible to prevent damage to these portions during demolding.

This is especially advantageous when manufacturing a tiny body through injection molding. By forming the runner as embedded in the add-on, it becomes possible to demold the molded body and the runner etc. integrally with each other. Further, it becomes possible to remove the runner together with the add-on before the debinding step. This remarkably increases production efficiency of small bodies.

Further, when the molded bodies which have been removed from the mold are transported, it is possible to handle them in the same manner as conventional resin molded bodies. For example, sintering compound injection molded bodies may be formed as buried in the add-on, which eliminates the risk of damaging the sintering compound injection molded bodies. This remarkably improves ease of handling the injection molded bodies, making possible to reduce defective products.

Further, the add-on may be formed for a purpose of providing convenient positioning of an injection molded body which is subjected to a secondary process before the debinding step. Still further, a plurality of sintering compound injection molded bodies may be formed integrally with each other via the add-on.

Further, the add-on may be used in order to maintain shape integrity of a sintering compound injection molded body during the debinding step and the sintering step. Still further, the add-on may be formed of a thermally insulating material for a purpose of increased moldability of the sintering compound.

There is no specific limitation as to where the add-on should be formed. The add-on may cover an entire surface or part of the sintering compound injection molded body, or may take the form of filler which can be made by injecting the add-on forming compound to a recess or a hollow space of the sintering compound injection molded body.

The add-on becomes removable or separable from the sintering compound injection molded body in the debinding step or the sintering step, and so does not adversely influence the sintering compound injection molded body.

Whichever of the sintering compound molding step and the add-on forming step may be performed before the other.

According to the second aspect of the invention, the add-on is first formed by injection molding, to provide a mold for a portion communicating with the sintering compound. Then the sintering compound is injected to form a body integrally with the add-on. The mold formed in the add-on may be for a part or all of the sintering compound injection molded body. If the mold is for the all, the injection molded body is formed as embedded in the add-on.

On the other hand, according to the third aspect of the invention, the sintering compound injection molded body is formed first, and then a part or all of the sintering compound injection molded body is used as a mold for the add-on. There is no specific limitation as to where the add-on should be formed. The add-on may be formed to partially cover the sintering compound injection molded body or to cover the entire surface of the sintering compound injection molded body. Also, if the sintering compound injection molded body has a hollow, then the hollow may serve as an add-on forming mold, into which the add-on forming compound is injected.

The sintering compound according to the present invention may include a binder and a sinterable powder, as are conventional powder injection molding compounds. There is no specific limitation to the kind of the binder or the sinterable powder. For example, according to the fourth aspect of the present invention, the sinterable powder may be provided by a metal powder or a ceramic powder.

According to the fifth aspect of the present invention, the add-on forming compound may contain the binder contained in the sintering compound or a main component of the binder. This enables to remove the add-on easily in the debinding step, together with the binder contained in the sintering compound injection molded body.

By forming the add-on of a resin material which has a higher thermal insulation than the metal mold, it becomes possible to slow down temperature decrease during the injection of the sintering compound. This improves fluidity of the injection molding compound in the metal mold, enabling to form highly accurate injection molded bodies.

According to the sixth aspect of the present invention, the add-on forming compound may contain a powder which does not sinter in the sintering step. For instance, when the sintering compound contains a metal powder which sinters at a certain sintering temperature, the "powder which does not sinter" may be provided by a powder of a ceramic which does not sinter at this particular sintering temperature. Generally, ceramic has higher sintering temperature than metal. Thus, in this particular injection molded body formed of the components mentioned above, the sintering compound injection molded body sinters at the predetermined sintering temperature whereas the add-on becomes powdery or sandy, making easy to be removed from the sintering compound injection molded body. In addition, since the sintering compound injection molded body becomes buried as the sintering step proceeds, the sintered body can be prevented from e.g. deformation during the sintering step. This is especially effective when the debinding step and the sintering step are performed continuously.

According to the seventh aspect of the present invention is the method in which the sintering compound and the add-on forming compound are made from materials which are not miscible with each other. For instance, the add-on forming compound may be provided by a resin which is not miscible with the resin binder contained in the sintering compound.

The add-on is removed or separated later from the sintering compound injection molded body. Therefore, by using an inmiscible material in the injection molding step, it becomes possible to improve e.g. surface accuracy of the sintered body. An example of the inmiscible combination is polyacetal resin (POM) used as a binder for sintering compound and acrylic resin (PMMA) used as an add-on forming compound.

The eighth aspect of the present invention relates to a sintered powder injection molded body formed by the above method according to the first aspect through seventh aspect. The method of the present invention enables efficient manufacture of products provided by bodies of sintered powder having shapes which have not been achievable conventionally.

The ninth aspect through thirteenth aspect of the present invention relate to manufacturing methods of a powder injection molded body.

The ninth aspect of the present invention relates to a method of manufacturing a powder injection molded body, including: a sintering compound molding step of forming a sintering compound injection molded body by injecting in a metal mold set provided with a sintering compound injecting molds a sintering compound containing a sinterable powder and a binder removable in a debinding step; and an add-on forming step of forming an add-on by injecting an add-on forming compound which becomes removable or separable from the sintering compound injection molded body in the debinding step or a sintering step. The sintering compound injection molded body and the add-on are formed integrally in the metal mold set.

In the powder injection molded bodies according to the present invention, the sintering compound injection molded body is protected by the add-on. Thus, the injection molded body has an increased strength, leading to increased ease of handling. This enables to treat the injection molded body as an intermediate product or as a part for the sintered body. Further, it is now possible to perform e.g. a secondary process easily to the intermediate.

The tenth aspect of the present invention is the manufacturing method, wherein the add-on formed in the add-on forming step includes part or all of the sintering compound injecting mold, and the sintering compound molding step is performed by injecting the sintering compound into the sintering compound injecting mold including said part or all.

The eleventh aspect of the present invention is the manufacturing method, wherein the sintering compound injection molded body formed in the sintering compound molding step includes part or all of the add-on mold, and the add-on forming step is performed by injecting the add-on forming compound into the metal mold set provided with the add-on mold including said part or all.

The twelfth aspect of the present invention is the manufacturing method, wherein the add-on forming compound contains a powder which does not sinter in the sintering temperature.

The thirteenth aspect of the present invention is the manufacturing method, wherein the sinterable powder is provided by a metal powder or a ceramic powder.

The fourteenth aspect through seventeenth aspect of the present invention relate to a powder injection molded body.

The fourteenth aspect of the present invention is a powder injection molded body provided integrally by: a sintering compound injection molded body formed of a sintering compound containing a sinterable powder and a binder removable in a debinding step; and an add-on formed of an add-on forming compound which becomes removable or separable from the sintering compound injection molded body in the debinding step or in the sintering step.

The fifteenth aspect of the present invention is the powder injection molded body, wherein the add-on covers part or all surface of the sintering compound injection molded body.

The sixteenth aspect of the present invention is the powder injection molded body, wherein the add-on forming compound contains a powder which does not sinter at sintering temperature of the sintering compound.

The seventeenth aspect of the present invention is the powder injection molded body, wherein the sinterable powder is provided by a metal powder or a ceramic powder.

The eighteenth aspect of the present invention relates to a metal mold set including: a sintering compound injecting mold for formation of a sintering compound injection molded body by injection of a sintering compound containing a sinterable powder and a binder removable in a debinding step; and an add-on mold for formation of an add-on formed by injection of an add-on forming compound which becomes removable or separable from the sintering compound injection molded body in the debinding step or in a sintering step. Each of the sintering compound injecting mold and the add-on mold is formable successively in the metal mold set.

The metal mold set includes a plurality of mold members, and is capable of providing a sintering compound injecting mold in the sintering compound molding step and an add-on mold in the add-on forming step. In the metal mold set, whichever of the sintering compound molding step and the add-on forming step may be performed before the other.

The nineteenth aspect of the present invention is the metal mold set, wherein part or all of the sintering compound injecting mold and/or the add-on mold is formed by a LIGA process. The LIGA process is suitable for formation of precise metal molds. Use of such a metal mold set enables to form minute parts of e.g. micro machines accurately and efficiently.

BEST MODE FOR CARRYING OUT THE INVENTION

FIG. 1 through FIG. 6 show a first embodiment of the present invention.

The present embodiment uses a feedstock, as a sintering compound, containing a powder of stainless steel and a polyacetal resin binder. Further, the present embodiment uses a feedstock, as an add-on forming compound, made from polyacetal resin which is a major component of the resin binder.

Figure 1:
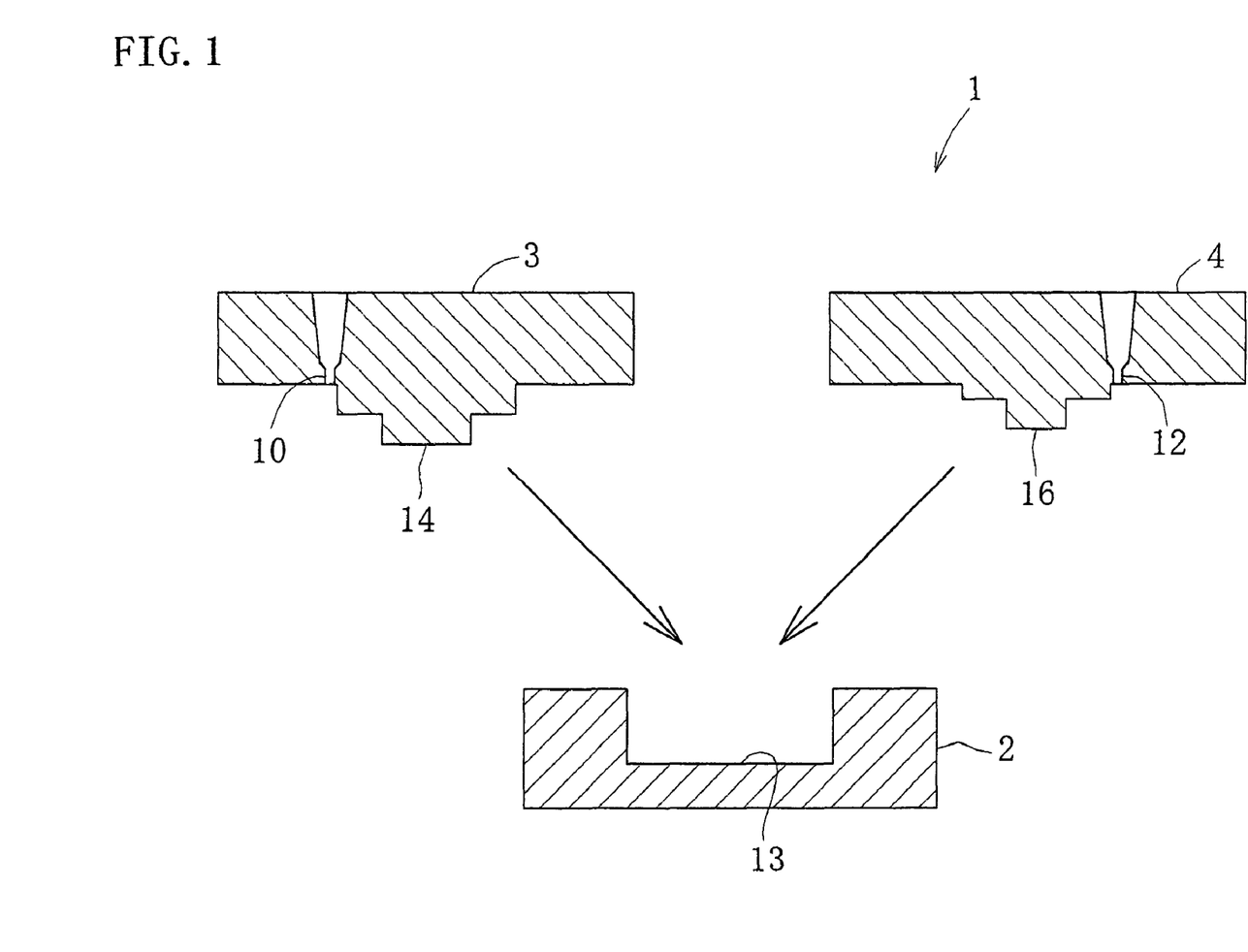
FIG. 1 is a sectional view of a mold set for forming an injection molded body according to a first embodiment of the present invention.

FIG. 1 shows an outline of a metal mold set 1 used for manufacture of a sintered powder injection molded body according to the present invention. The present embodiment is an application of the present invention to manufacture of a stepped and bottomed cylinder shown in FIG. 5 and FIG. 6.

In the present embodiment, the metal mold set 1 includes a lower half 2 and two upper halves 3, 4 each to be coupled with the lower half 2 successively. By coupling each of the upper halves 3, 4 successively with the lower half 2, two spaces are provided successively for two shots of injection molding. By injecting into the two spaces successively, using a biaxial injector for example, an injection molded body according to the present invention is formed.

With reference to FIG. 2 through FIG. 6 and FIG. 13, a method of making a sintered powder molded body according to the present embodiment will be described specifically.

Figure 2:
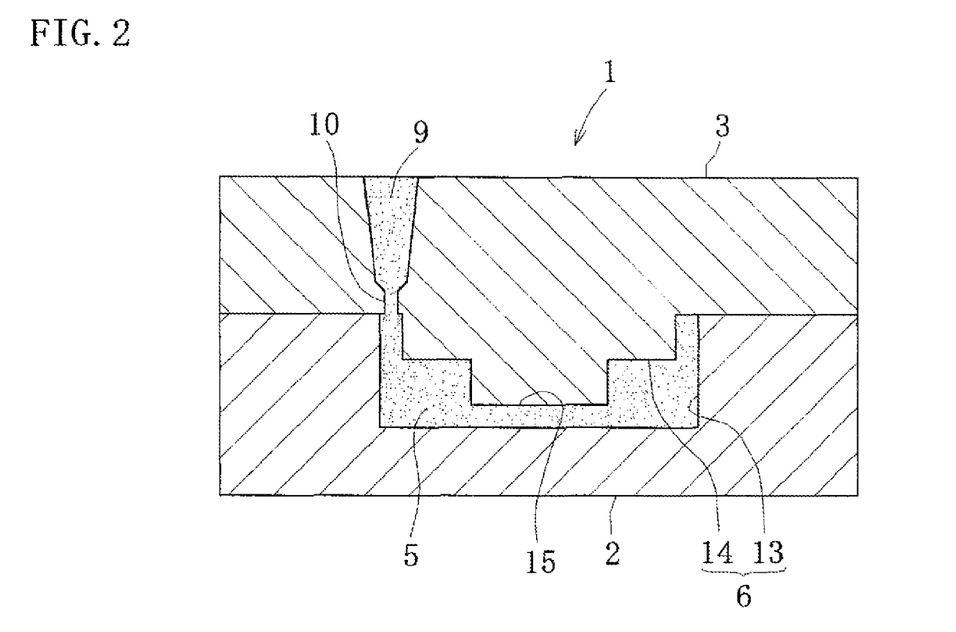
FIG. 2 is a sectional view illustrating how an add-on is formed using the mold set in FIG. 1.

According to the present embodiment, the lower half 2 and the upper half 3 are fitted to each other as shown in FIG. 2, to form an add-on mold 6 (S101). The lower half 2 is formed with a mold 13 shaped as an inner wall of a cylinder. On the other hand, the upper half 3 is formed with a mold 14 to give a shape of a stepped cylinder corresponding to an outer shape of the sintering compound injection molded body. The upper half 3 is provided with a gate 10 for injecting an add-on forming compound 9. By injecting the add-on forming compound 9 through the gate 10 into an add-on forming compound injection molding space formed by the lower half 2 and the upper half 3, there is formed an add-on 5 which has a step-less columnar outer wall and a stepped inner wall serving as a recessed mold 15 that gives a shape of stepped outer surface corresponding to the outer wall of the sintering compound injection molded body 7 (S102).

Figure 3:
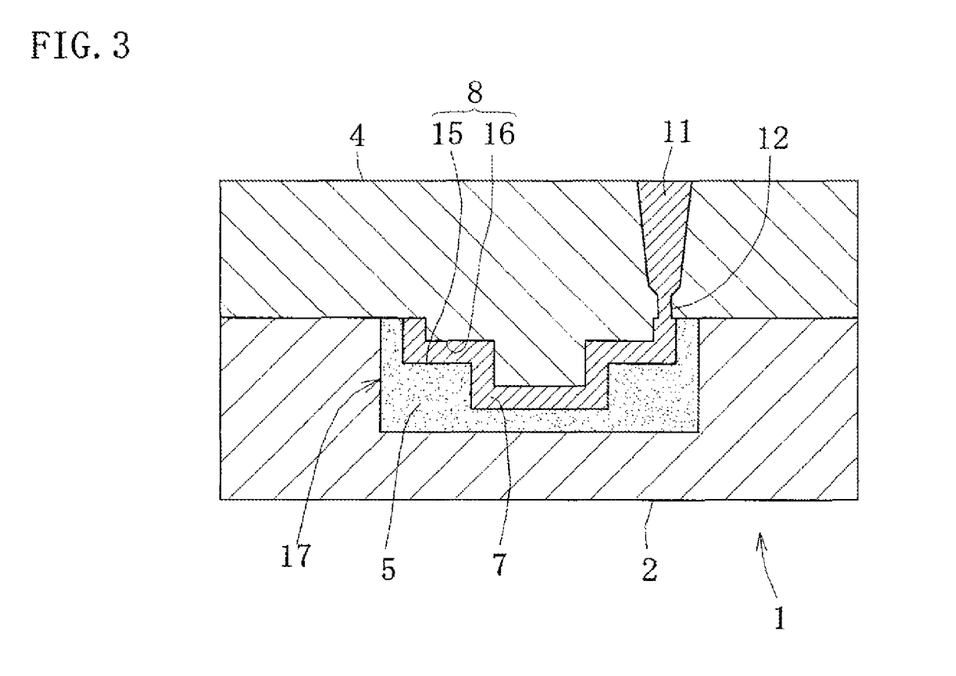
FIG. 3 is a sectional view illustrating how a sintering compound injection molded body is molded using the mold set in FIG. 1.

After the formation of the add-on 5, the upper half 3 is replaced with the upper half 4. The upper half 4 is formed with a mold 16 shaped as a stepped column 16 corresponding to the inner wall of the sintering compound injection molded body 7. The mold 15 of the add-on 5 and the mold 16 of the upper half 4 combine to form a sintering compound injecting mold 8 which provides an injection space into which a sintering compound 11 is to be injected (S103). The upper half 4 is formed with a gate 12 for injecting the sintering compound 11. By injecting the sintering compound 11 through the gate 12 into this injection space, there is formed an injection molded body 17 which is an integral body of the add-on 5 and the sintering compound injection molded body 7 (S104).

According to the present embodiment, the add-on 5 is formed of a resin material, and therefore sintering compound injecting mold 8 has an increased thermal insulation. For this reason, the injected sintering compound does not lose fluidity, making possible to form the sintering compound injection molded body 7 to a high level of accuracy.

Figure 4:
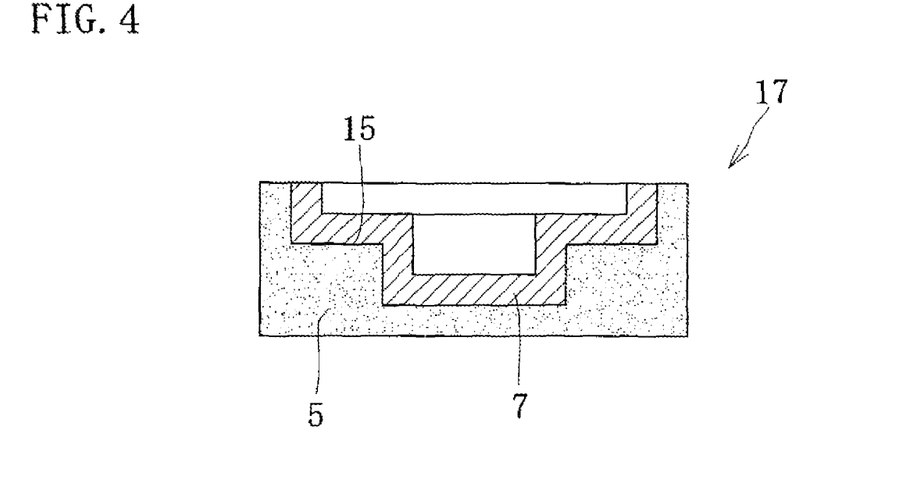
FIG. 4 is a sectional view of an injection molded body molded by using the mold set in FIG. 2 and FIG. 3.
Figure 5:
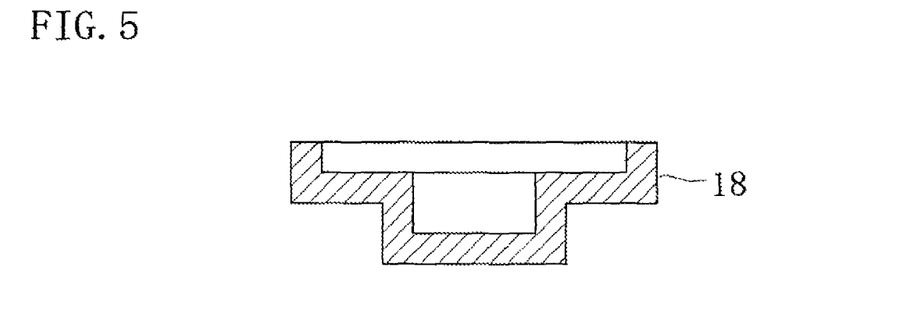
FIG. 5 is a sectional view of a sintered powder injection molded body obtained by debinding and sintering the injection molded body in FIG. 4.
Figure 6:
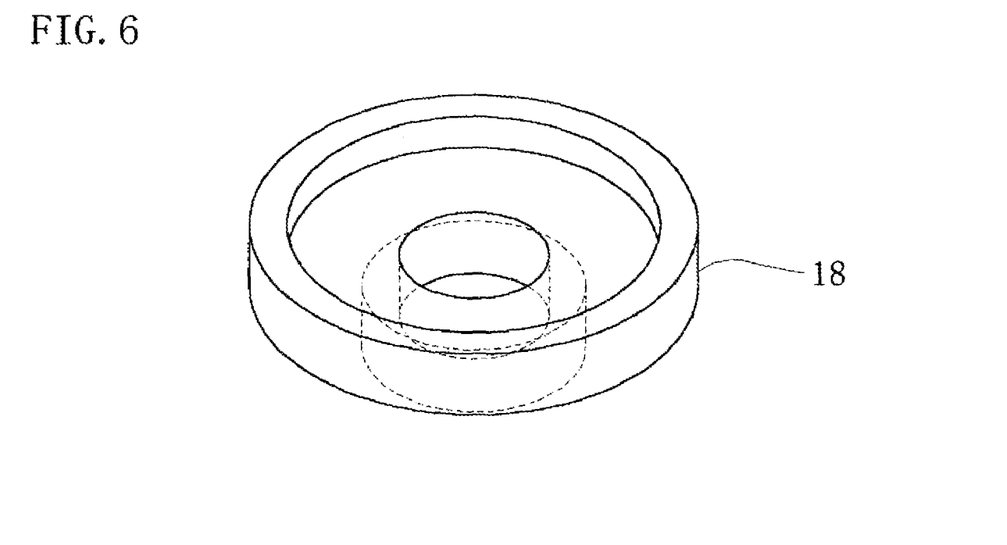
FIG. 6 is a perspective view of the sintered powder injection molded body in FIG. 5.

Next, the injection molded body 17 is removed from the metal mold set (S105). The sintering compound injection molded body 7 contains a high percentage of powder, and therefore is low in strength. For this reason, the sintering compound injection molded body 7 injected directly in a metal mold set often has its corners, for example, damaged during release from the mold. However, according to the present embodiment, as shown in FIG. 4, the outer surface of the sintering compound injection molded body 7 is covered by the add-on 5 formed integrally therewith, and this prevents potential damage to the corners and other parts.

Next, the injection molded body 17 is moved to a debinding furnace to perform a debinding step (S106). According to the present embodiment, it is possible to protect the outside of the injection molded body 17 during the transportation of the demolded injection molded body 17 to the debinding furnace. Thus, handling of the injection molded body 17 becomes remarkably easy, leading to significant improvement in yield.

The add-on 5 according to the present embodiment is formed of the same resin material as the resin binder used in the sintering compound. Therefore, the add-on 5 can be removed from the sintering compound injection molded body simultaneously with the resin binder in the debinding step.

After the resin binder and the add-on mold are removed in the debinding step, a sintering step is performed (S107). The debinding step and the sintering step may be performed continuously in the same furnace. The sintering step yields a sintered powder injection molded body 18 (S108).

FIG. 7 through FIG. 12 show a second embodiment of the present invention. The embodiment is an application of the present invention to a case where a plurality of the sintering compound injection molded bodies 7 according to the first embodiment are manufactured simultaneously by injection molding.

Figure 7:
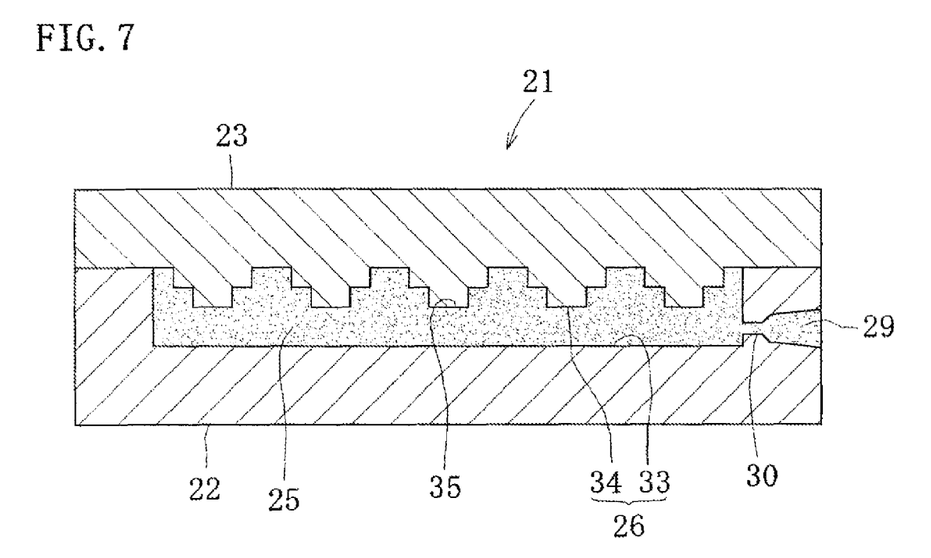
FIG. 7 is a sectional view corresponding to FIG. 2, and illustrates how an add-on for an injection molded body according to a second embodiment of the present invention is formed.
Figure 8:
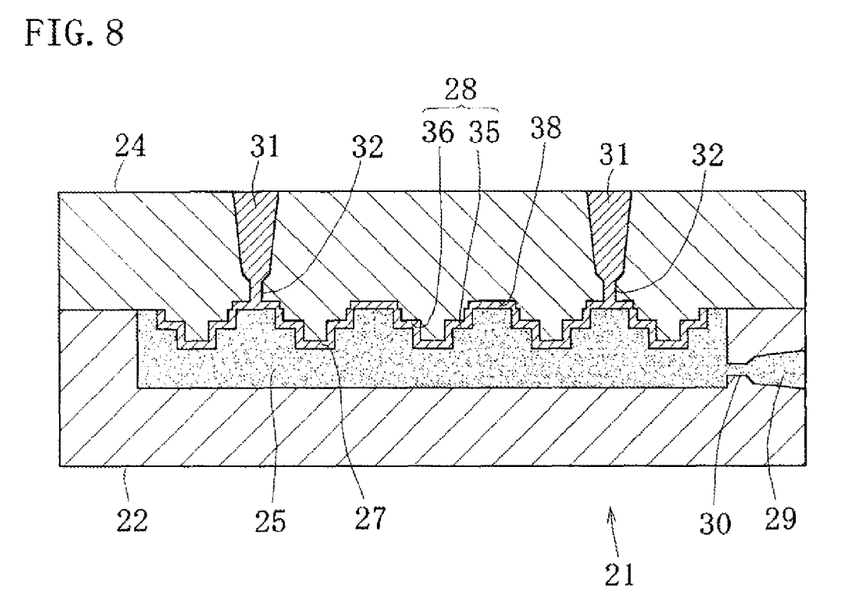
FIG. 8 is a sectional view corresponding to FIG. 3, and illustrates how a sintering compound injection molded body of a powder injection molded body according to a second embodiment of the present invention is molded.

As shown in FIG. 7 and FIG. 8, a metal mold set 21 according to the present embodiment include, as is the first embodiment, a lower half 22 and two upper halves 23, 24 each to be coupled with the lower half 22 successively. The lower half 22 is formed with a gate 30 for injecting an add-on forming compound 29. On the other hand, the upper half 24 is formed with a pair of gates 32, 32 for injecting a sintering compound 31.

Figure 13:
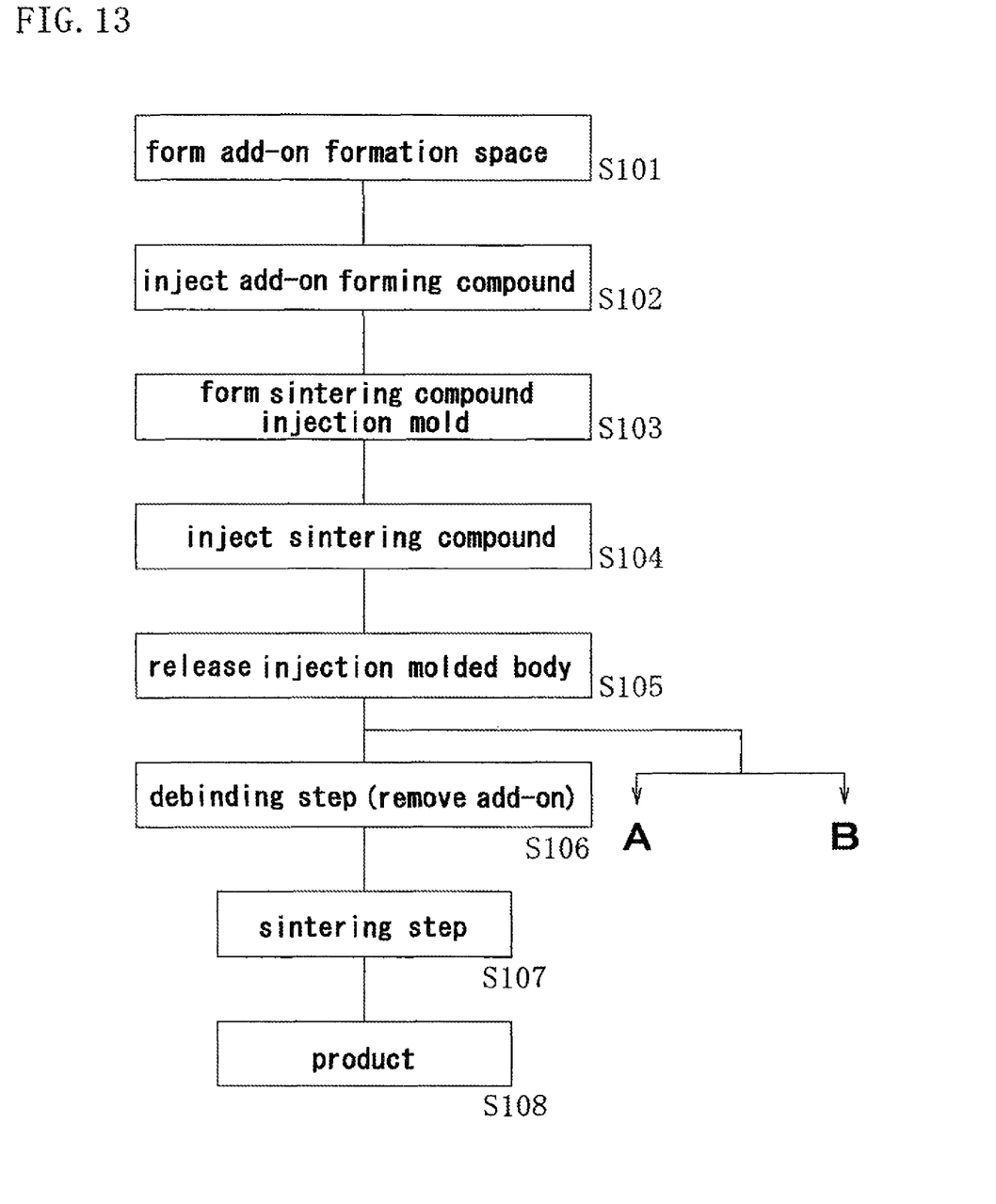
FIG. 13 is a flowchart showing steps in a manufacturing method of the sintered powder injection molded body according to the first embodiment of the present invention.
Figure 14:
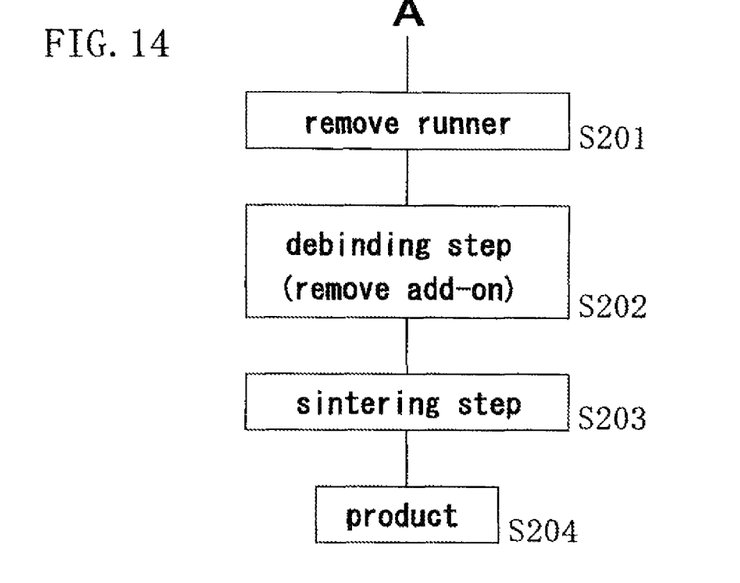
FIG. 14 is a flowchart showing some steps in a manufacturing method of the sintered powder injection molded body according to the second embodiment of the present invention.

With reference to FIG. 13 and FIG. 14, a method of making a body of sintered powder according to the present embodiment will be described specifically. It should be appreciated that Step 101 through Step 105 in FIG. 13 are performed in the same procedures as in the first embodiment.

According to the present embodiment, first, the lower half 22 and the upper half 23 are fitted to each other to form an add-on mold 26 (S101). As shown in FIG. 7, the lower half 22 is formed with a recessed mold 33 provided by rectangular inner walls. On the other hand, the upper half 23 is formed with a mold 34 having a shape representing a plurality of stepped columns each corresponding to an outer surface of the sintering compound injection molded body. By fitting the mold 33 and the mold 34 to each other, an add-on mold 26 is formed. By injecting an add-on forming compound 29 into the add-on formation space, there is formed an add-on 25 having a rectangular outer walls and an inner wall serving as a recessed mold 35 which corresponds to outer walls of the sintering compound injection molded bodies 7 (S102).

Figure 9:
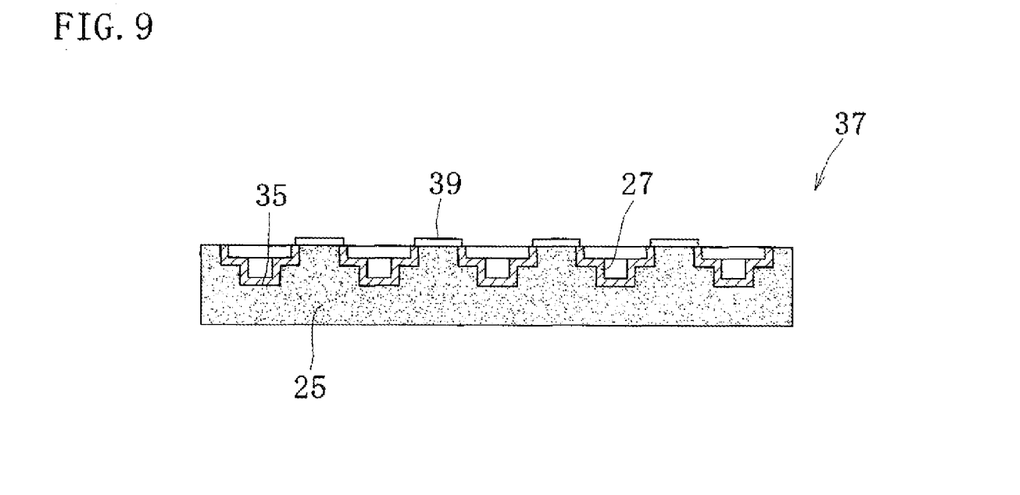
FIG. 9 is a sectional view of the injection molded body manufactured through the steps in FIG. 7 and FIG. 8.
Figure 10:
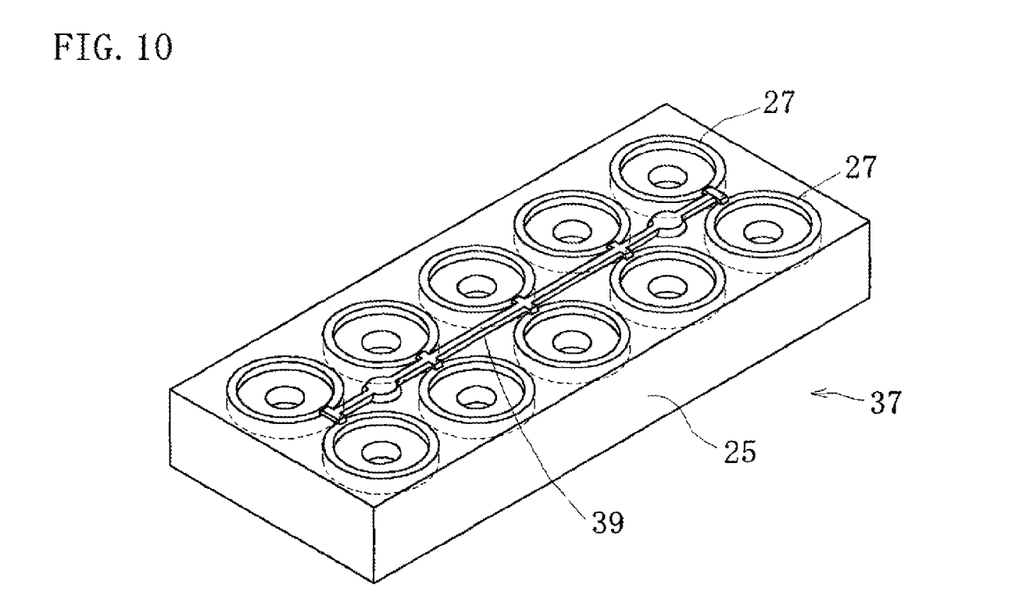
FIG. 10 is a perspective view of the injection molded body in FIG. 9.

After the formation of the add-on 25, the upper half 23 is replaced with the upper half 24. As shown in FIG. 8, the upper half 24 is formed with a plurality of molds 36 each shaped in a stepped column corresponding to the inner wall of the sintering compound injection molded body 27, and a runner mold 38 connecting each of the molds 36. The recessed mold 35 of the add-on 25 and the mold 36 of the upper half 24 combine to form a sintering compound injecting mold 28 which provides a sintering compound injection space, or a space into which a sintering compound 31 is to be injected (S103). With this construction, the sintering compound 31 is injected into the sintering compound injection space via the runner mold 38, to form an injection molded body 37 which is an integral body of the add-on 25, the sintering compound injection molded bodies 27 and a runner 39, as shown in FIG. 9 and FIG. 10 (S104).

Next, the injection molded body 37 is removed from the metal mold set 21 (S105). The sintering compound injection molded body 27 contains a high percentage of powder, and therefore is low in strength. Further, the runner 39 is narrower and weaker than the sintering compound injection molded body 27. For this reason, it would be very difficult for the sintering compound injection molded bodies to be removed from the mold integrally with the runner 39. However, as shown in FIG. 9 and FIG. 10, the injection molded body 37 according to the present embodiment has the add-on 25 integrally formed to cover the outer surfaces of the sintering compound injection molded bodies 27, and therefore, it is very easy to demold while protecting the sintering compound injection molded bodies 27 and the runner 39. Further, when the injection molded body 37 is moved to a debinding furnace after the demolding, it is possible to protect the outside of the sintering compound injection molded bodies 27 with the add-on 25, so handling becomes remarkably easy. It should be noted here that the runner 39 is on and above a surface of the add-on according to the embodiment, but the runner 39 may be formed entirely in the add-on 25.

Figure 11:
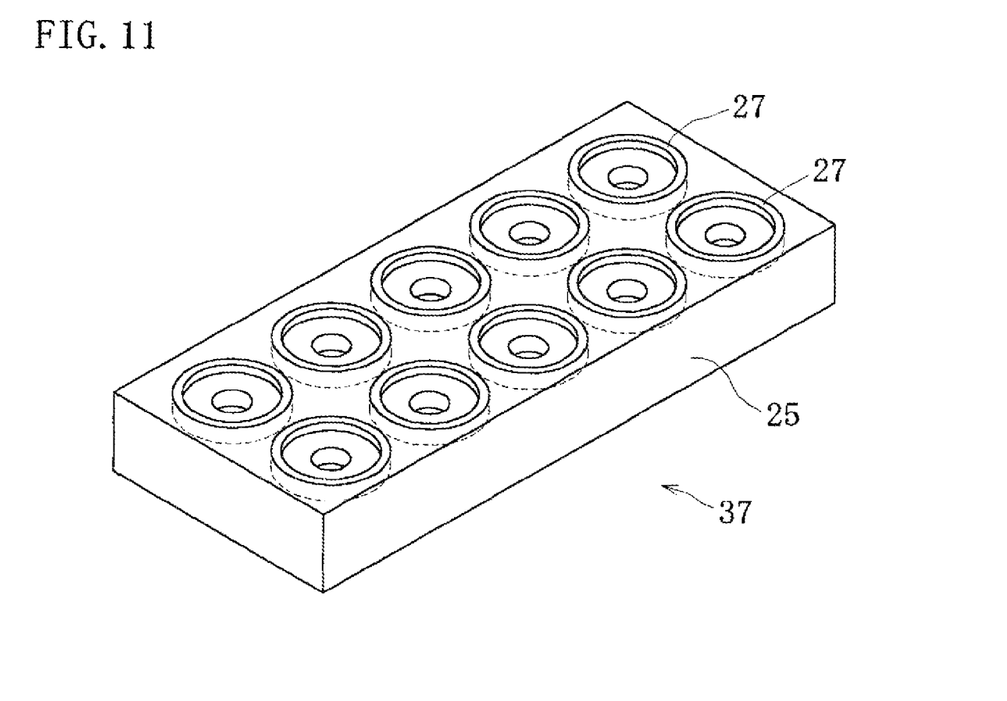
FIG. 11 is a perspective view of the injection molded body in FIG. 10 as after a secondary process of removing a runner.
Figure 12:
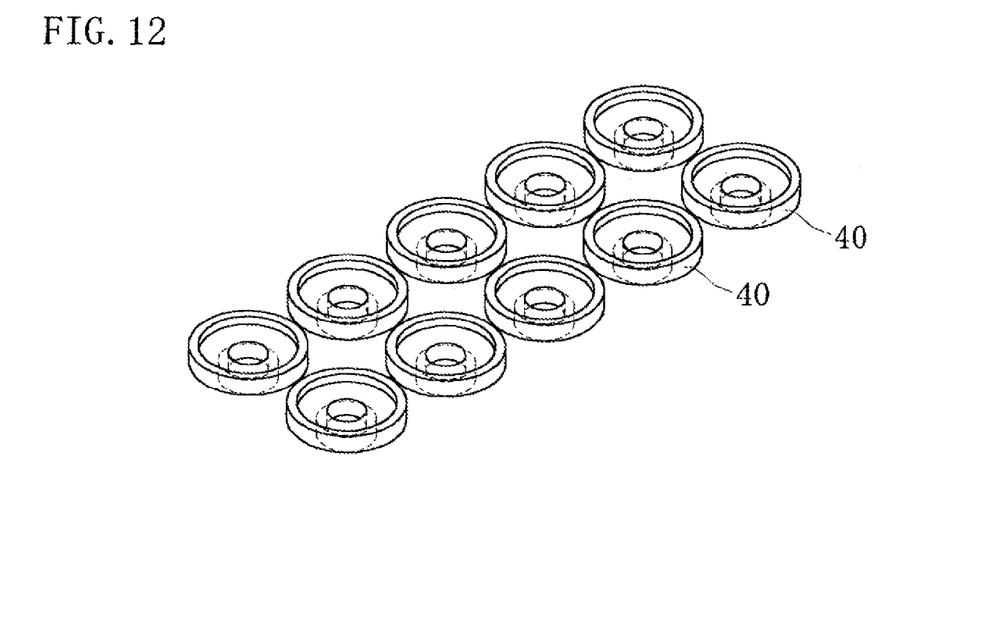
FIG. 12 is a perspective view of a sintered powder injection molded body obtained by debinding and sintering the injection molded body in FIG. 11.

According to the present embodiment, the runner 39 of the injection molded body 37 protrudes above a surface of the rectangular body of the add-on 25. Therefore, as shown in FIG. 11, the runner 39 can be easily removed by machining after the injection (S201). After the removal of the runner 39, debinding and sintering are performed (S202, 5203) to obtain sintered bodies 40 shown in FIG. 12 (S204).

Further, according to the present embodiment, a plurality of sintering compound injection molded bodies 27 line up in a regular pattern, which makes it easy to perform secondary process such as drilling before the debinding step. This can not only improve yield remarkably but also improve production efficiency remarkably.

Figure 15:
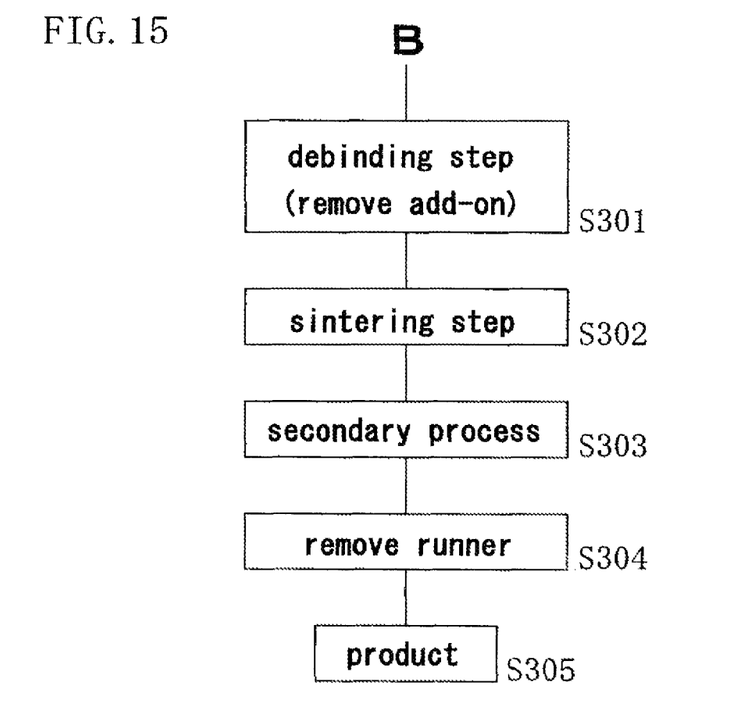
FIG. 15 is a flowchart showing some steps in a manufacturing method of the sintered powder injection molded body according to the third embodiment of the present invention.

FIG. 15 shows a flowchart according to a third embodiment of the present embodiment. In the present embodiment, Steps 301 through 305 are performed after the Step 105 in FIG. 13 is performed.

In the present embodiment, the runner stays attached during a debinding step (S301) and a sintering step (S302). Since a plurality of bodies line up in a regular pattern via the runner, secondary process such as drilling and plating can be performed efficiently. The runner is removed by machining after the secondary process.

Figure 16:
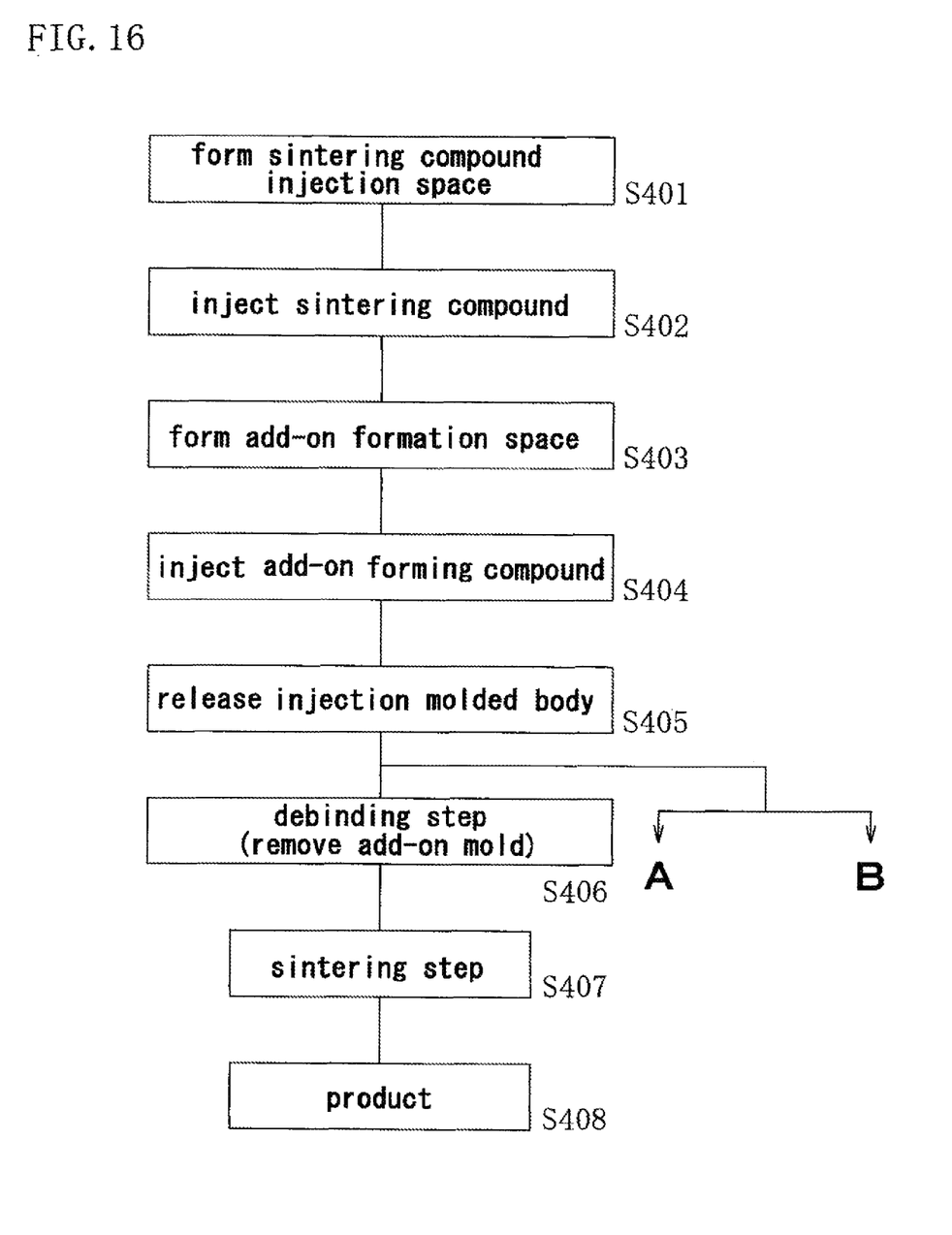
FIG. 16 is a flowchart showing some steps in a manufacturing method of a sintered powder injection molded body according to a fifth embodiment of the present invention.

FIG. 16 shows a flowchart according to a fourth embodiment of the present embodiment. In the present embodiment, Steps 101 through 108 in FIG. 13 are replaced with Step 401 through Step 408.

It should be noted here that after Step 405, the process flow may be moved to the steps shown in FIG. 14 or in FIG. 15.

The add-on 5 for the injection molded body shown in FIG. 4 can be formed after the formation of the sintering compound injection molded body, depending on the shape or purpose. In the present embodiment, first, a sintering compound injection space is formed (S401), then a sintering compound is injected (S402), then an add-on formation space is formed (S403), and then an add-on forming compound is injected (S404). The present embodiment is suitable for an injection molded body having a simple shape but requires formation of positioning tabs for example, necessary for complex secondary process.

Figure 17:
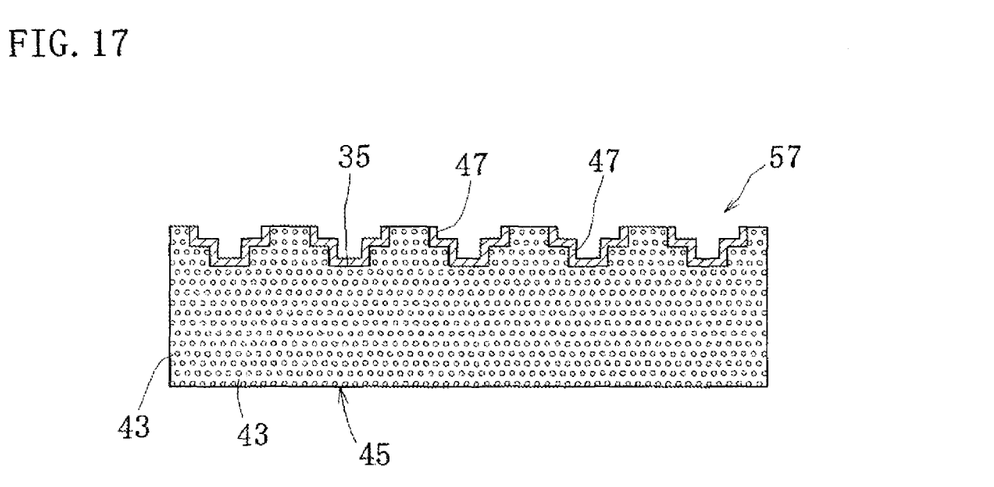
FIG. 17 is a sectional view of an injection molded body according to a sixth embodiment.
Figure 18:
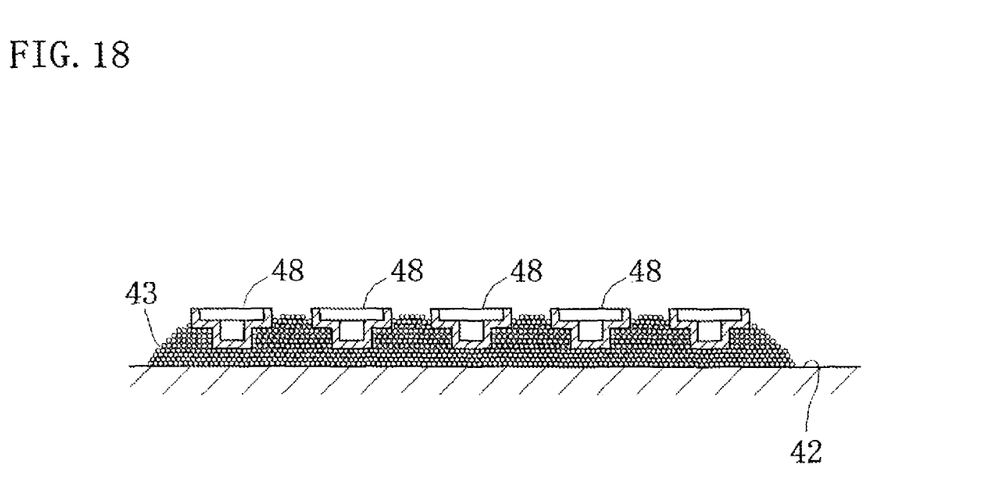
FIG. 18 is a sectional view illustrating the injection molded body in FIG. 17 as debound.

FIG. 17 and FIG. 18 show a fifth embodiment of the present embodiment.

As shown in FIG. 17, the present embodiment uses a sintering compound containing a metal powder, and a resin binder which is removed during the debinding step, as in the first embodiment. On the other hand however, the add-on forming compound contains the resin binder and a ceramic powder 43 which does not sinter at sintering temperature for the metal powder.

The present embodiment differs in the component materials of the add-on, but all the steps of injection molding, debinding and sintering are performed in the same way as in the other embodiments already described, so these will not be described here again. It should also be noted here that for the sake of describing functions, the ceramic powder 43 is illustrated so that each particle is visibly recognizable. However, there is no limitation to the particle size and so on of the ceramic powder, and these may be selected in accordance with the shape, material, purpose and so on of the sintered body.

An injection molded body 57 shown in FIG. 17 is molded in a rectangular add-on 45 containing the ceramic powder 43, in which a plurality of sintering compound injection molded bodies 47 are fittingly formed as in the second embodiment in FIG. 9. By forming the add-on 45 integrally with the sintering compound injection molded bodies 47, the embodiment offers the same advantages as offered by each of the other embodiments described earlier, including protection to the sintering compound injection molded bodies, improved demolding, handling and other aspects of workability.

On the other hand, the add-on 45 contains the powder 43 which does not sinter at sintering temperature of the metal powder. Thus, when the resin binder is removed in the debinding step through the sintering step, the add-on behaves like sand as illustrated in FIG. 18, making it very easy to remove from the sintering compound injection molded bodies after debinding or from a sintered body 48 after sintering.

As shown in FIG. 18, if the injection molded body is placed on a floor 42 of the debinding furnace or sintering furnace during the debinding or sintering step, the sintered body 48 are debound or sintered as buried in the body of the ceramic powder. This offers an advantage that the sintering compound injection molded bodies are protected from deformation during the debinding or sintering step.

It is also possible to arrange so that ceramic powder in the add-on loses its shape integrity either in the debinding step or in the sintering step. Especially when the debinding step and the sintering step are performed continuously, it is advantageous to have such an ability to selectively cause the ceramic powder to break down in one of the steps or over the two steps.

The present invention is not limited to the modes of embodiments thus far described. There is no limitation, either, to the shape or material components of the sintering compound injection molded body or the add-on, and a variety of shapes and component combinations may be used.

The embodiments use a metal powder as the sintering material, but ceramic powders and other sinterable powders may be used.

Further, in the embodiments, the add-on forming compound contains the same resin as used in the resin binder contained in the sintering compound. However, other resins may be used. For example, the add-on forming compound may contain a resin which is not miscible with the resin binder contained in the sintering compound, for improved surface accuracy in the sintering compound injection molded body.

Further, in the embodiments, the add-on and the sintering compound injection molded body are each formed by a single injecting operation. Alternatively however, they may be formed by a plurality of injection steps.

Further, in the embodiments, the add-on and the sintering compound injection molded body are each formed of a single material. Alternatively however, they may be formed of a plurality of materials through a plurality of injection steps.

Still further, the present application discloses an application of the present invention to a hot injection molding process. However, the present invention is also applicable to a cold injection molding process using aqueous binders.

What is claimed is:
1. A powder injection molded body provided integrally by:
   a sintering compound injection molded body formed of a sintering compound containing a sinterable powder and a binder removable in a debinding step; and
   an add-on formed of an add-on forming compound which becomes removable or separable from the sintering compound injection molded body in the debinding step or in a sintering step, wherein the add-on embeds therein an outer periphery and one side with respect to the periphery of the molded body so as to protect the molded body from damage by mechanical contact with other objects while being handled.

2. The powder injection molded body according to claim 1, wherein the add-on forming compound contains a powder which does not sinter at sintering temperature of the sintering compound.

3. The powder injection molded body according to claim 1, wherein the sinterable powder is provided by a metal powder or a ceramic powder.

* * * * *